United States Patent
Nagarajan et al.

(10) Patent No.: US 12,342,399 B2
(45) Date of Patent: Jun. 24, 2025

(54) ADAPTIVE SIMULTANEOUS MULTILINK OPERATIONAL FRAMEWORK

(71) Applicant: Avago Technologies International Sales Pte. Limited, Singapore (SG)

(72) Inventors: Jayaraman Nagarajan, Bangalore (IN); Rupesh Krishnakumar Vaddella, Bangalore (IN); Shivkumar Basavaraj Tadahal, Bangalore (IN); Rohit Upmanyu, Bangalore (IN); Manoj Raveendranath Kamath, Bangalore (IN); Sreenath Sharma, Bangalore (IN); Deepak Kumar Damodaran, Bangalore (IN)

(73) Assignee: Avago Technologies International Sales Pte. Limited, Palo Alto, CA (US)

( * ) Notice: Subject to any disclaimer, the term of this patent is extended or adjusted under 35 U.S.C. 154(b) by 753 days.

(21) Appl. No.: 17/696,768

(22) Filed: Mar. 16, 2022

(65) Prior Publication Data
US 2023/0247696 A1  Aug. 3, 2023

(30) Foreign Application Priority Data
Jan. 28, 2022  (IN) .............................. 202211004818

(51) Int. Cl.
*H04W 76/15* (2018.01)
(52) U.S. Cl.
CPC ................................... *H04W 76/15* (2018.02)
(58) Field of Classification Search
CPC .................................................. H04W 76/15
See application file for complete search history.

(56) References Cited

U.S. PATENT DOCUMENTS

2023/0126846 A1*  4/2023  Ratnam ................. H04W 84/12
370/311

FOREIGN PATENT DOCUMENTS

| JP | 2023516121 A | * | 4/2023 | |
| JP | 7439299 B2 | * | 2/2024 | ............. H04L 5/001 |
| KR | 20230049725 A | * | 4/2023 | |
| WO | WO-2020085997 A1 | * | 4/2020 | ........... H04L 1/1896 |
| WO | WO-2021010606 A1 | * | 1/2021 | ............. H04L 69/14 |
| WO | WO-2021010663 A1 | * | 1/2021 | ............ H04W 28/18 |
| WO | WO-2021089022 A1 | * | 5/2021 | ........... H04L 1/1614 |
| WO | WO-2021180541 A1 | * | 9/2021 | ........ H04L 61/6022 |

* cited by examiner

*Primary Examiner* — Saad A. Waqas
(74) *Attorney, Agent, or Firm* — Quarles & Brady LLP (57) ABSTRACT

A system may include a processor, and a non-transitory computer readable medium having encoded thereon a set of instructions executable by the processor to establish a first multilink connection associated with a first basic service set and a second multilink connection associated with a second basic service set, set the second basic service set as a priority basic service set, switch an enabled link of the first basic service set on which communications are carried, and in response to determining that the enabled link of the first basic service set has been switched, switch an enabled link of the second basic service set based, wherein switching the enabled link of the second basic service set includes enabling the first link while the second link is concurrently enabled for a first duration, and disabling the second link after the first duration.

25 Claims, 8 Drawing Sheets

ADAPTIVE SIMULTANEOUS MULTILINK OPERATIONAL FRAMEWORK

CROSS-REFERENCE TO RELATED APPLICATIONS

This application claims priority to Indian Provisional Patent Application Ser. No. 202211004818, filed Jan. 28, 2022 by Jayaram Nagarajan et al., entitled "ADAPTIVE SIMULTANEOUS MULTILINK OPERATIONAL FRAMEWORK," the disclosures of which are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for wireless multilink communications.

BACKGROUND

With increasing Wi-Fi penetration and growing numbers of connected mobile devices, modern day smartphones are expected to support multiple connections simultaneously over the same and on different channels. Supporting simultaneous Wi-Fi connections has given grounds to build many ubiquitous use cases, such as streaming video from a smartphone or tablet to a television, while the phone remains connected to the access point (AP). The advent of 802.11be multi-link (ML) has further expanded the horizon by providing multiple links to operate on a per base service set (BSS), reducing latency, and opening up a new avenue for real-time p2p gaming applications, virtual reality (VR) and/or augmented reality (AR) applications, and other low latency applications.

Thus, methods, systems, and apparatuses for an adaptive simultaneous ML operational framework are provided.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF EMBODIMENTS

Various embodiments provide tools and techniques for adaptive simultaneous multilink operation are provided.

In some embodiments, a method for adaptive simultaneous multilink operation is provided. A method may include establishing, via a multilink device station, a first multilink connection associated with a first basic service set and a second multilink connection associated with a second basic service set, setting, via an adaptive simultaneous multilink engine, the second basic service set as a priority basic service set, the priority basic service set configured to have at least one link of the second multilink connection enabled at all times, and switching, via the adaptive simultaneous multilink engine, an enabled link of the first basic service set on which communications are carried. Switching the enabled link may include switching from using a first link of the first multilink connection to a second link of the first multilink connection, based at least in part on a dynamic dwell duration of the first basic service set. The method may further include, in response to determining that the enabled link of the first basic service set has been switched, switching an enabled link of the second basic service set based, at least in part, on the dynamic dwell duration. The dynamic dwell duration of the first basic service set may be determined based, at least in part, on one or more connection metrics, and switching the enabled link of the second basic service set may include enabling the first link while the second link is concurrently enabled for a first duration, and disabling the second link after the first duration.

In some embodiments, an apparatus for adaptive simultaneous multilink operation is provided. The apparatus may include a non-transitory computer readable medium in communication with the processor, the non-transitory computer readable medium having encoded thereon a set of instructions executable by a processor to perform various functions. The set of instructions may be executed by the processor to establish, via a multilink device station, a first multilink connection associated with a first basic service set and a second multilink connection associated with a second basic service set, set the second basic service set as a priority basic service set, the priority basic service set configured to have at least one link of the second multilink connection enabled at all times, and switch an enabled link of the first basic service set on which communications are carried. Switching the enabled link may include switching from using a first link of the first multilink connection to a second link of the first multilink connection, based at least in part on a dynamic dwell duration of the first basic service set. The set of instructions may further be executed by the processor to, in response to determining that the enabled link of the first basic service set has been switched, switch an enabled link of the second basic service set based, at least in part, on the dynamic dwell duration. The dynamic dwell duration of the first basic service set may be determined based, at least in part, on one or more connection metrics, and switching the enabled link of the second basic service set may include enabling the first link while the second link is concurrently enabled for a first duration, and disabling the second link after the first duration.

In in further embodiments, a system for adaptive simultaneous multilink operation is provided. The system may include a processor, and a non-transitory computer readable medium in communication with the processor, the non-transitory computer readable medium having encoded thereon a set of instructions executable by the processor to establish, via a multilink device station, a first multilink connection associated with a first basic service set and a second multilink connection associated with a second basic service set, set the second basic service set as a priority basic service set, the priority basic service set configured to have at least one link of the second multilink connection enabled at all times, and switch an enabled link of the first basic service set on which communications are carried. Switching the enabled link may include switching from using a first link of the first multilink connection to a second link of the first multilink connection, based at least in part on a dynamic dwell duration of the first basic service set. The set of instructions may further be executed by the processor to, in response to determining that the enabled link of the first basic service set has been switched, switch an enabled link of the second basic service set based, at least in part, on the dynamic dwell duration. The dynamic dwell duration of the first basic service set may be determined based, at least in part, on one or more connection metrics, and switching the enabled link of the second basic service set may include enabling the first link while the second link is concurrently enabled for a first duration, and disabling the second link after the first duration.

In the following description, for the purposes of explanation, numerous details are set forth to provide a thorough understanding of the described embodiments. It will be apparent to one skilled in the art, however, that other embodiments may be practiced without some of these details. In other instances, structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Similarly, when an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Furthermore, the procedures of the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The various embodiments include, without limitation, methods, systems, apparatuses, and/or software products. Merely by way of example, a method might comprise one or more procedures, any or all of which may be executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, embodying software products and computer-performed methods, represent tangible, concrete improvements to existing technological areas, including, without limitation, the operation of multilink devices and management of multilink connections. As used herein, multilink connections may refer to connections in which concurrent transmissions may take place over multiple links, where each of the multiple links may communicate (e.g., transmit and receive data) over different frequency bands/channels. In further examples, multilink connections may further include connections in which a wireless station may communicate on multiple bands concurrently. In other words, a wireless station may exchange data concurrently on multiple bands. Thus, in various examples set forth below, a multilink connection may include, without limitation, connections established utilizing multi-link operation as set forth under the IEEE 802.11be standard.

Specifically, implementations of various embodiments provide a way for a multilink device station to concurrently maintain two or more multilink connections to respective multilink device access points. Moreover, in some aspects, a framework for the simultaneous use of multiple multilink operation modes is provided. Specifically, switching algorithms for switching between multiple multilink operation modes, including a mode in which multiple operational modes may be entered simultaneously may be provided.

Conventional approaches to multilink communications do not allow for the support of multiple concurrent multilink connections. Moreover, switching of multilink operation modes typically require re-association of a connection operating in a given multilink operation mode. Thus, the embodiments set forth below allow for a more robust and efficient management framework for adaptive simultaneous multilink operation.

To the extent any abstract concepts are present in the various embodiments, those concepts can be implemented as described herein by devices, software, systems, and methods that involve novel functionality (e.g., steps or operations), such as the maintaining of multiple concurrent multilink connections while maintaining a persistent multilink connection for a prioritized basic service set. Further, novel functionality involving the ability to switch between multiple multilink operation modes, including a multilink operation mode in which two multilink operation modes may simultaneously be utilized, are set forth by the embodiments below.

Figure 1:
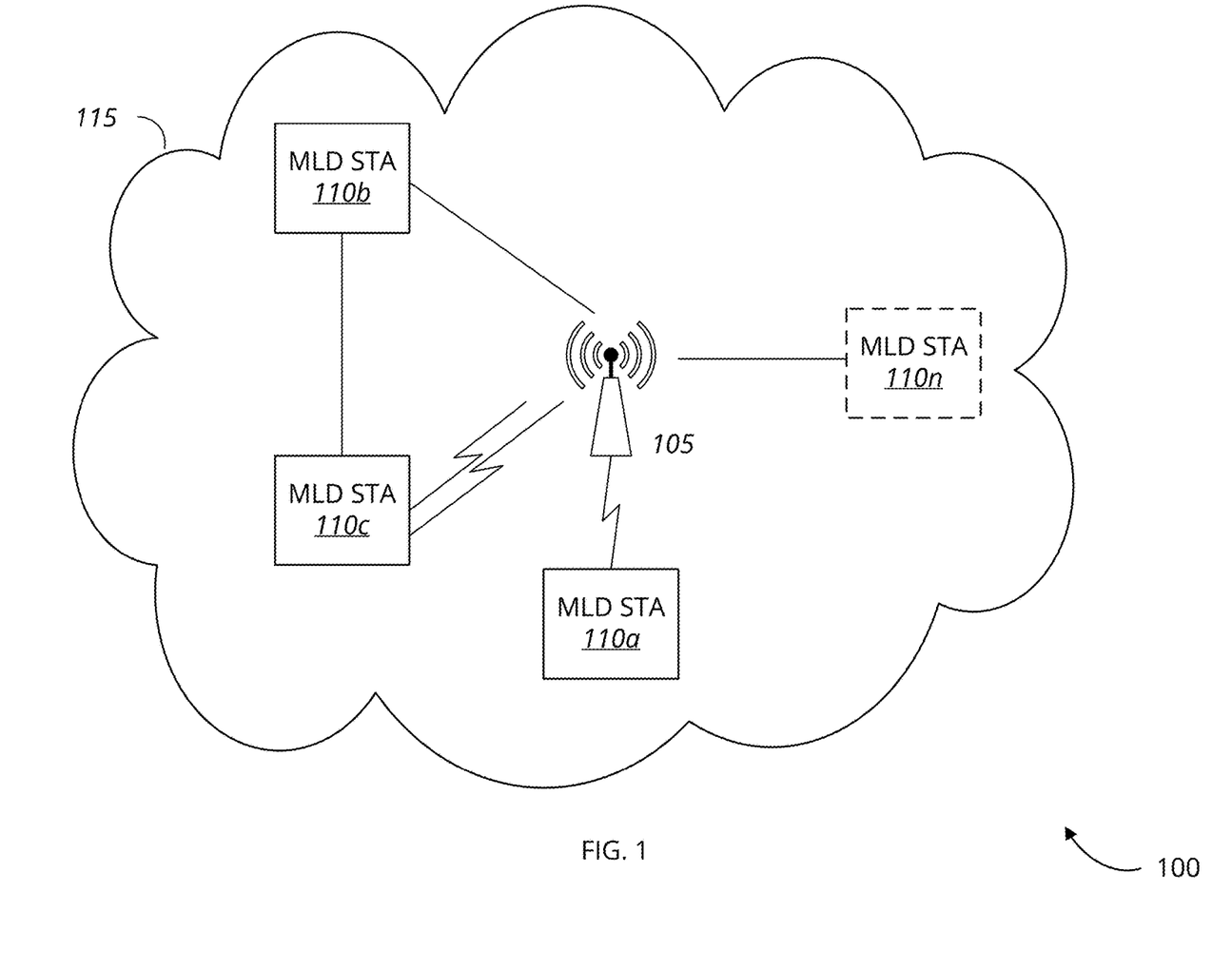
FIG. 1 is a schematic block diagram of a wireless communication network, in accordance with various embodiments.

FIG. 1 is a schematic block diagram of a wireless communication network 100. The wireless communication network 100 includes an access point (AP) 105, and one or more multilink device (MLD) station (STA) 110a-110n. Together the access point 105 and one or more MLD STAs 110a-110n form wireless local area network (WLAN) 115. It should be noted that the various components of the wireless communication network 100 are schematically illustrated in FIG. 1, and that modifications to the components and arrangement of the components may be possible and in accordance with the various embodiments.

In various embodiments, the AP 105 may be coupled to the one or more MLD STAs 110a-110n. In some embodiments, the MLD STAs 110a-110n may further be coupled to each other, as shown by second MLD STA 110b and third MLD STA 110c. Moreover, in some embodiments, a single MLD STA, such as third MLD STA 110c, may be coupled to the AP 105 via multiple communication links.

Various embodiments relate generally to multi-link (ML) communications, and specifically to adaptive simultaneous ML operation in a communication session between wireless communication devices. In ML communications, a single ML association may provide for a plurality of communication links shared between MLDs, which may respectively include one or more APs, such as AP 105, and/or one or more STAs 110a-110n. In some examples, if congestion on a first communication link is above a certain level, the MLD devices may switch from communicating on the first communication link to communicating on a second communication link. By providing a single ML association context that can be shared between multiple APs and STAs, MLD devices may switch between different communication links or groups of communication links without disassociating or re-associating with one another. For example, communication links may include, without limitation, communication links in the 2.4 GHz, 5 GHz, and 6 GHz bands. Accordingly, in various embodiments, the MLDs may include one or more transceivers, coupled to respective radios, to transmit and/or receive communications in the 2.4 GHz, 5 GHz, and 6 GHz bands. The MLDs may, in some examples, include a wireless integrated circuit (IC) device, such as a wireless chipset. In some examples, the wireless IC device may further include the transceiver, one or more radios, antennas, a controller or processor (e.g., digital signal processor (DSP) and/or other control module), storage, and/or logic for executing the techniques and processes described with respect to the embodiments below.

In various embodiments, WLAN 115 may be implemented utilizing one or more of the IEEE 802.11 family of standards. These standards may include, without limitation, 802.11ah, 802.11ad, 802.11ay, 802.11ax, 802.11az, 802.11ba, and 802.11be. The WLAN 115 may include numerous MLDs, such as AP 105 and STAs 110a-110n. In some examples, while only one AP 105 is shown, the WLAN network 115 may include multiple APs. In some examples, AP 105 may be an MLD AP, which may itself include one or more AP devices, each capable of establishing a respective basic service set (BSS). A BSS may refer to a collection of stations and/or APs which may communicate together within a wireless network, and which may share physical-layer medium access characteristics (e.g., frequency band, security settings, etc.).

In various embodiments, the one or more MLD STAs 110a-110n may include user equipment, such as, without limitation, mobile devices, smartphones, tablet computers, laptop computers, vehicles, display devices, media players, smart speakers, IoT devices, including smart appliances, and other wireless end-user devices capable of connecting to the AP 105. In some embodiments, the AP 105 and an associated set of MLD STAs of the one or more MLD STAs 110a-110n, may be referred to as a BSS. In some examples, MLD STAs 110a-110n may form networks without ad-hoc networks with other MLD STAs 110a-110n. Examples may include mesh networks, or peer-to-peer networks. In some examples, MLD STAs 110a-110n may establish connections with each other through the AP 105 and/or through direct wireless links.

In some examples, an MLD STA 110 may have the opportunity to select from multiple BSSs within range, or to select between specific APs. Together, the set of multiple BSSs may be referred to as an extended service set (ESS). Accordingly, in some examples, any single MLD STA 110a-110n may be associated with different APs, and further may select an AP with which to associate based on one or more connection metrics. Connection metrics for selecting an AP and/or BSS may include, for example, latency, throughput, received signal strength indicator (RSSI), signal to noise ratio (SNR), jitter, and packet loss, among other metrics.

In various embodiments, each AP may support one or more communication links to a respective MLD STA 110a-110n. ML communication may support the simultaneous transmission and reception over the one or more links. For example, the third MLD STA 110c may communicate in parallel with the AP 105 over two or more links. The MLD STA 110c may both receive and transmit packets over any of the two or more links, and further data carried by the two or more links may be upstream, downstream, or a combination of upstream and downstream packets at a given time. Accordingly, in some examples, supported multilink operation (MLO) modes may include simultaneous transmit and receive multilink (STR-ML) mode, and an enhanced multilink single radio (EMLSR) mode.

In STR-ML, an MLD STA 110a-110n may use different radios for STR on different respective channels/bands, such as 2G (e.g., 2.4 GHz), and 5G (e.g., 5 GHz) and 6G (e.g., 6 GHz) frequency bands. In EMLSR mode, the MLD STA 110a-110n may utilize a single radio to support multiple links, for example, in 5G and 6G bands. Thus, in EMLSR, a single radio may be configured to support communication on two or more links, each of the two or more links established over a respective channel (e.g., in the 5G and 6G band). However, communication may occur over a single link of the two or more links at a given time. Communication may include both transmit and receive functionality with an MLD AP, such as AP 105.

A framework for dynamically switching between MLO modes and adaptively switching STR-ML links are provided below, with respect to FIGS. 2-7.

Figure 2:
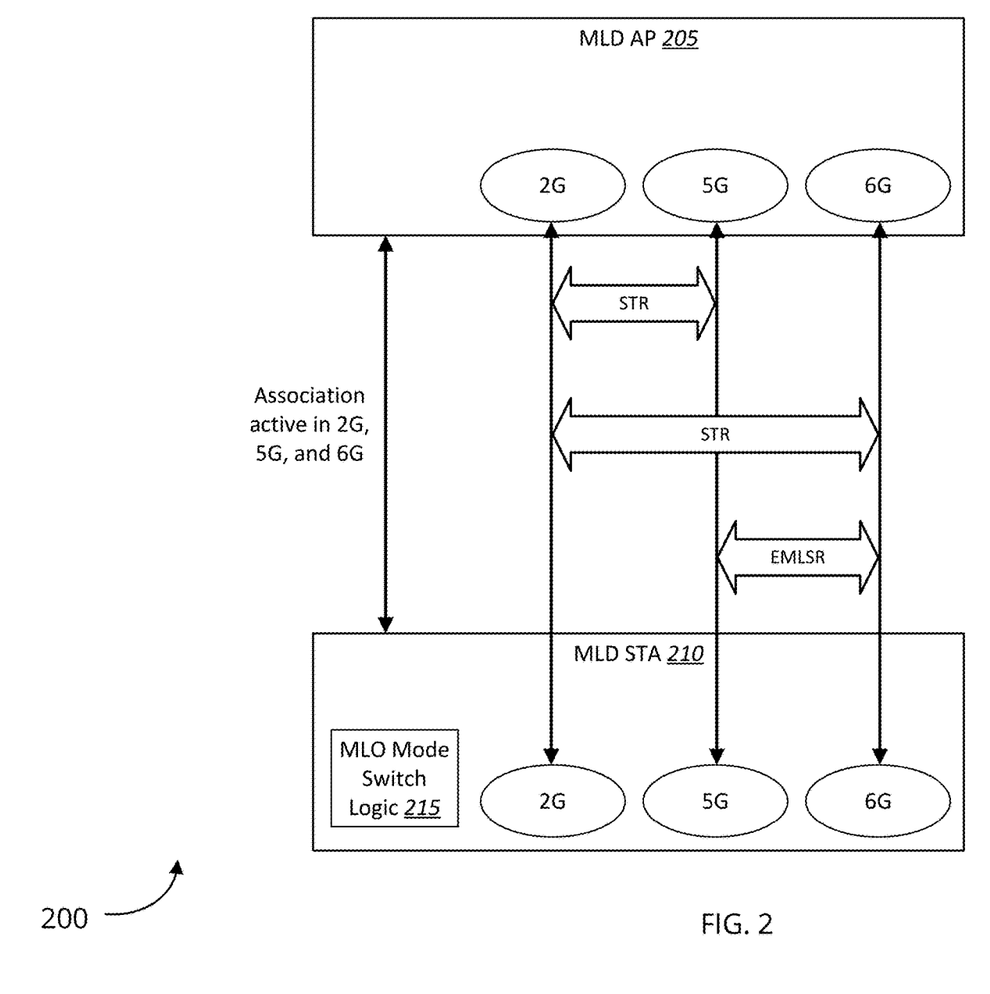
FIG. 2 is a schematic block diagram of a system for simultaneous STR-ML and EMLSR operation, in accordance with various embodiments.

FIG. 2 is a schematic block diagram of a system 200 for simultaneous STR-ML and EMLSR operation, in accordance with various embodiments. The system 200 includes MLD AP 205 and MLD STA 210. The MLD STA 210 may further include MLO mode switch logic 215.

In various embodiments, the MLD AP 205 may include multiple radios which may respectively support different links, configured with required isolation precautions to achieve medium efficiency. MLD STA 210, however, may be limited in the number of radios and chip size. Moreover, in some examples, MLD STA 210 may roam between APs, leading to a change in link parameters in multiple links dynamically. The link parameters may also depend on the presence of interference from other radios (e.g., Bluetooth radios). The above problems cannot be addressed using STR-ML and EMLSR modes individually.

Accordingly, in various embodiments, MLO mode switch logic 215 may be configured to dynamically switch between MLO modes: 1) STR-ML on 2G and 5G/6G; 2) EMLSR on 5G and 6G; and 3) simultaneous operation of STR-ML on 2G and 5G/6G and EMLSR on 5G and 6G. MLO modes may be switched without disruption of traffic and without needing to repeat the association process. Specifically, mode switching may be accomplished by exchanging frames directly with the MLD AP 205 to indicate entry of one or more links into a power-save mode, such as setting power management bits (PM bits), and/or a specific EML operating mode notification, as will be described in greater detail below. In various embodiments, mode selection may be determined based on one or more connection metrics. Connection metrics may include, without limitation, channel statistics, chip level interference, range, and RSSI.

In some examples, channel statistics may include overlapping BSS (OBSS) statistics, independent BSS (IBSS) statistics, and historical transmit (Tx) rates. In OBSS, transmissions by neighboring devices on the WLAN may cause interference. Interference on 2 of the 3 links (e.g., 2G, 5G, and 6G) can effectively be addressed because one link will remain available to service low latency traffic. For example, communication on either of the 5G and 6G links may have OBSS interference. Accordingly, STR-ML may be utilized on two of the links (e.g., 2G and 6G and/or 2G and 5G) on which interference is not detected. In another example, if during operation, interference is detected on the 2G link, operation may be switched to EMLSR on the unaffected link (e.g., 6G or 5G link). In IBSS, an MLD AP may transmit with other peers on any given link, rendering the channel unusable for other MLD STAs. Thus, the other two channels that are not utilized may operate in STR-ML mode. For example, in IBSS, the MLD AP may utilize either the 5G link (or alternatively the 6G link), rendering the link unusable for other MLD STAs. Thus, the other two channels, 2G and 6G (or alternatively the 2G and 5G links) may operate in STR-ML mode. If the 2G link is rendered unusable, either of the 5G and/or 6G links may be utilized in EMLSR mode. Thus, the MLO mode switch logic 215 may determine an MLO mode in which to operate based on usage statistics of channels at the MLD AP in OBSS and/or IBSS. In some further examples, historical transmit rates may also be used to determine which channels to be used in which MLO modes. For example, a channel may historically be under-utilized or heavily utilized by corresponding MLD STAs. Under-utilized channels may be selected for usage in STR-ML and/or separately for use as an EMLSR channel. Thus, the MLO mode switch logic 215 may further utilize historical Tx rates to determine a channel for STR-ML and/or EMLSR operation.

In some examples, chip level interference from other radios may be used to determine MLO mode switching. Specifically, in multi-radio chips utilizing independent radios, Tx and receive (Rx) on a given radio may cause chip-level interference with other radios (e.g., Bluetooth or long-term evolution (LTE) radios). For example, activity detected on the Bluetooth radio at 2.4 GHz may lead to a switch to EMLSR operation in 5G/6G radios instead of the 2G (2.4 GHz) radio. Specifically, while the 2G radio is utilized by a Bluetooth module, when the 2G radio of the MLD STA is handed over to the Bluetooth module, either of the 5G and/or 6G links may continue to be utilized in EMLSR mode, without the need to disconnect and re-associated with the MLD AP 205.

In some examples, the range and RSSI of a channel may be used to determine an MLO mode. For example, if an MLD STA is moving away from an AP, resulting in a dropping RSSI, a move to 2G as part of STR-ML may improve performance. For example, a radio operating in EMLSR mode on a 5G and/or 6G link may experience degrading RSSI. Accordingly, the MLO mode switch logic 215 may switch back to STR mode to maintain the link to the MLD AP 205 via the 2G link, which may have a longer range.

In yet further embodiments, the MLD STA 210 may contend on all links for Tx concurrently. This may allow the MLD STA 210 to attain very low latency to attain low latency and fast medium access is guaranteed. For example, all three links may be used to send the same frame, with the MLD STA 210 utilizing the 2G and 5G (or alternatively 6G) channel in STR-ML, and the remaining channel, in this example the 6G (or alternatively 5G) channel in EMLSR mode. In some examples, for EMLSR operation, a forced association may be performed for the 5G and/or 6G link in EMLSR first. The two channels not in EMLSR operation may be operated in STR-ML. In further examples, modes may subsequently be switched according to the connection metrics as previously described.

Thus, by utilizing MLO mode switching, better battery efficiency of the MLD STA 210 may be realized by better utilization of radios. Moreover, better performance of the radios may be realized, as better latency figures may be achieved through use of the appropriate MLO mode, and contending on multiple links. Connection to the MLD AP 205 further is not disrupted, and range is improved by avoiding unnecessary roaming. Moreover, on the MLD STA 210, smaller die sizes may be realized as a fewer number of active radios may be utilized. According to various embodiments, like the MLO mode switch logic 215 may be implemented in hardware, software, or both hardware and software. MLO mode switch logic 215 may, in some examples, include system on a chip (SoC) firmware, which may further interface with other hardware and/or software.

Figure 3:
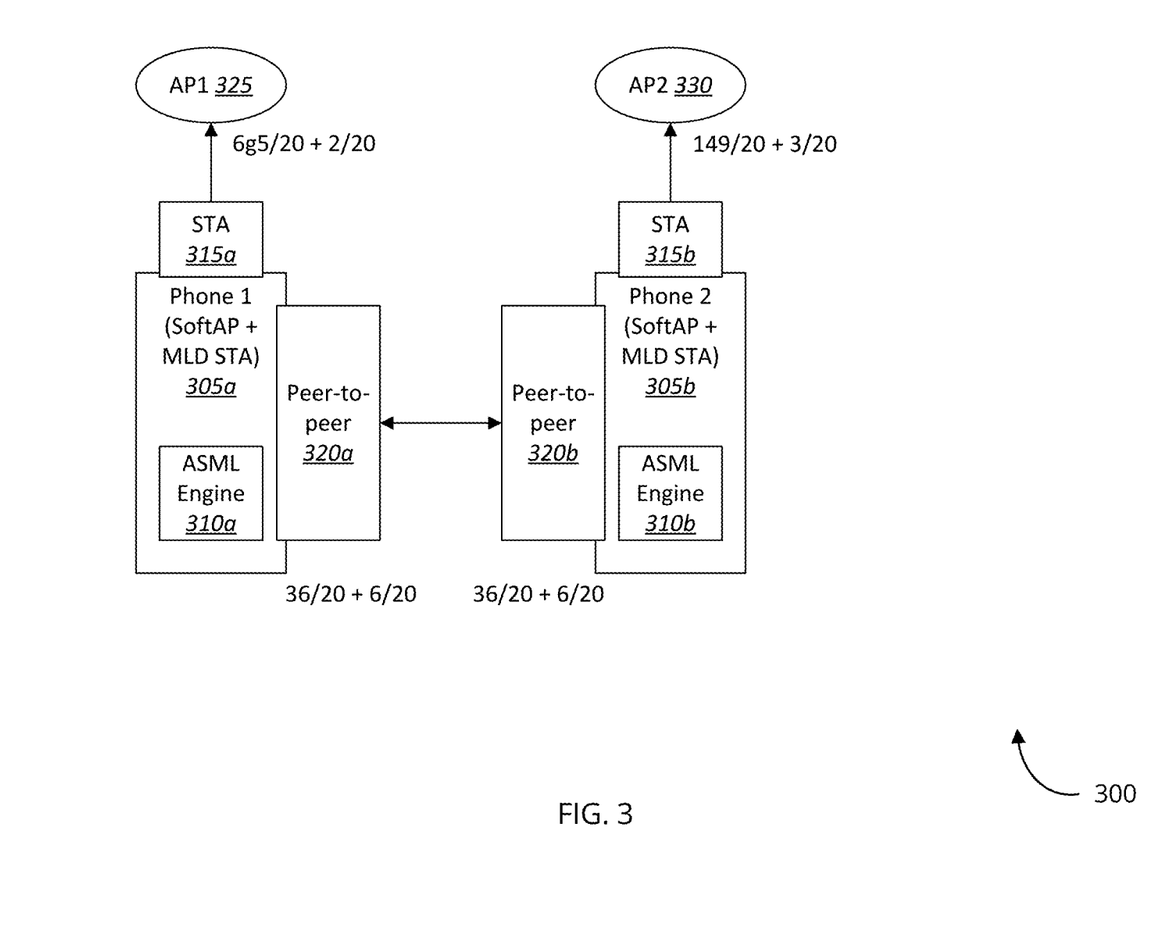
FIG. 3 is a schematic block diagram of a network arrangement for adaptive simultaneous multilink operation, in accordance with various embodiments.

FIG. 3 is a schematic diagram of a network arrangement 300 for adaptive simultaneous multilink (ASML) operation, in accordance with various embodiments. The network arrangement 300 may comprise a first MLD STA, phone 1 305a, a second MLD STA, phone 2 305b, a first AP, AP1 325, and second AP, AP2 330. Phone 1 305a may include ASML engine 310a, and a first STA 315a. Phone 2 305b may include ASML engine 310b, and a second STA 315b. The first STA 315a of the MLD STA, in this example phone 1 305a, may be coupled to AP1 325. The second STA 315b of phone 2 305b may be coupled to AP2 330. Phone 1 305a and phone 2 305b may further be coupled to each other via a peer-to-peer connection 320a, 320b (e.g., NaN or WFA P2P, among others). It should be noted that the various components of the network arrangement 300 are schematically illustrated in FIG. 3, and that modifications to the components and arrangement of the components may be possible and in accordance with the various embodiments.

Figure 4:
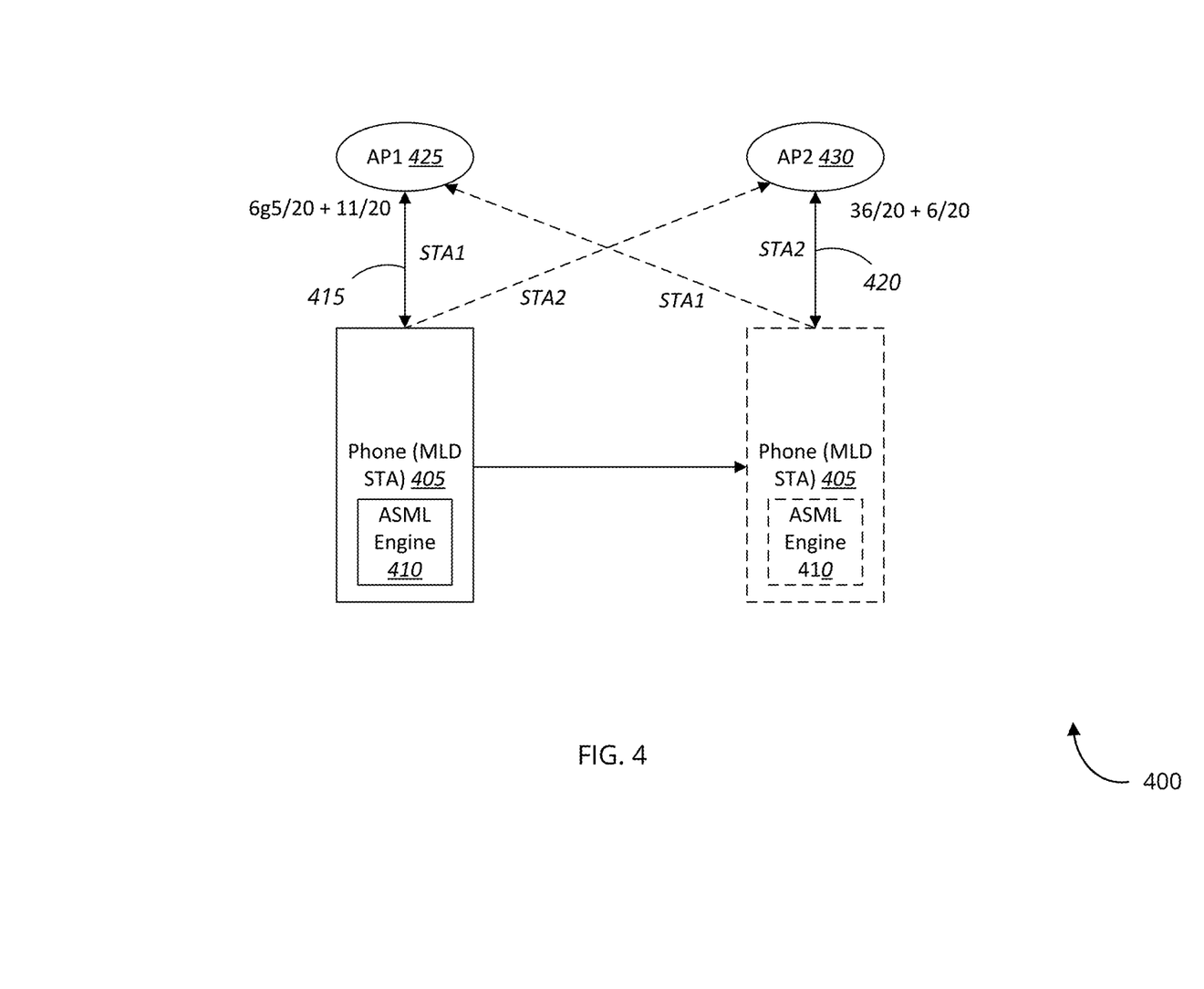
FIG. 4 is a schematic diagram of an alternative network arrangement for adaptive simultaneous multilink operation, in accordance with various embodiments.

FIG. 4 is a schematic diagram of an alternative network arrangement 400 for adaptive simultaneous multilink operation, in accordance with various embodiments. The network arrangement 400 includes an MLD STA, phone 405, a first AP, AP1 425, and a second AP, AP2 430. The phone 405 may further include ASML engine 410. Phone 405 may be connected through first STA, STA1, via connection 415, to AP1 425. Similarly, phone 405 may be connected through second STA, STA2, via connection 420, to AP2 430.

In various embodiments, peer to peer applications, such as gaming, and AR/VR related applications, typically consume high bandwidth and rely on low latency. Typically, these use cases utilize multiple Wi-Fi connections to be maintained in tandem, such as STA1 (BSS0)+STA2 (BSS1) of the same MLD STA (shown below in FIG. 4), or STA (BSS0)+P2P (BSS1) without affecting traffic, as shown in FIG. 3. It is to be understood that while phones 305a, 305b, 405 are used as examples of MLD STAs in FIGS. 3 & 4, MLD STAs are not limited in any way to phones, and in other examples, other types of MLD STAs, as previously described, may be utilized in accordance with the embodiments described above and set forth below.

With reference to FIGS. 3 & 4, the network arrangement 300 depicts an arrangement in which a file transfer/peer-to-peer connection is established with respective infra-AP connections active. Thus, a connection between first STA 315a and AP1 325, and second STA 315b and AP2 330 may form BSS0, while the peer-to-peer connection 320a, 320b forms BSS1. The network arrangement 400 depicts an arrangement in which the MLD STA, in this case phone 405, roams from a position closer to AP1 425 to a position closer to AP2 430. The connection between STA1 of phone 405 and AP1 425 (e.g., connection 415) may form BSS0, while a connection between STA2 of phone 405 and AP2 430 (e.g., connection 420) may form BSS1.

In various embodiments, for each of the arrangements 300, 400, ASML engine 310a, 310b, 410 may be configured to adaptively switch between BSSs and to maintain simultaneous multilink connections in the respective BSSs. ASML is proposed to be a system in which an MLD STA having independent radios on 2G and 5G bands can form and maintain two simultaneous STR ML connections with minimal disruption to end-to-end packet latency and throughput. Specifically, ASML may determine when and whether to switch between ML links (e.g., between BSSs), based on one or more connection metrics. According to various embodiments, connection metrics may include, without limitation, a priority of BSS, channel statistics (e.g., interference, traffic, busy or reserved channels, etc.), end-user requirements (e.g., throughput and latency per BSS), and packet success rates per link per modulation and coding scheme (MCS), and link RSSI. Typical TDM-based simultaneous operation requires an STA to remain off of an AP channel for fixed durations (e.g., 50 ms, etc.), so that the MLD AP may service other BSS/APs. ASML allows for dynamic adjustment of channel usage and dwell duration based on the connection metrics, while also allowing a priority BSS to always remain enabled (e.g., at all times while the priority BSS is active and needs the multilink connection).

With respect to FIG. 3, for example, a file transfer may occur over the peer-to-peer connection 320a, 320b of the respective STAs, while maintaining respective connections to APs, AP1 325 and AP2 330. In this example, phone 1 305a may include multiple ML connections between STA 315a and AP1 325. When a direct peer-to-peer connection is enabled between phone 1 305a and phone 2 305b, a prioritized BSS may always be maintained. In this example, the priority BSS may be the peer-to-peer connection, which may be utilized for low latency traffic. Similarly, with respect to FIG. 4, in one set of examples, a connection 420 between STA2 and AP2 430 may be given priority over a connection 415 between STA1 and AP1 425.

Accordingly, BSS1 may be prioritized over BSS0. Continuing with this example, BSS1 may be a multilink BSS, utilizing two links, a first link (L0) associated with a 5G/6G band, and a second link (L1) operating in a 2G band. Similarly, BSS0 may be a multilink BSS operating utilizing the same links. Thus, because the links and/or radios are shared, utilization of the channels may be switched utilizing a TDM scheme with priority given to the peer-to-peer connection of BSS1, such that at least one link on BSS1 is always enabled while BSS1 is active. In other words, when a link is enabled, communication for BSS0 occurs over the link. Thus, while BSS1 is active (e.g., a communication session is ongoing in the BSS and a multilink connection of the BSS is active, and/or the BSS is not in a power-save, idle, sleep, or other inactive mode), at least one link of BSS0 may remain enabled and continue the exchange data. In contrast, a non-priority BSS (BSS0) may have to release a link (e.g., cease communication on a link) before switching to the other link. Thus, there is a period of time in which both links are disabled (e.g., data is not exchanged on any link) when links are switched.

For example, while a 5G/6G channel is available, BSS0 may utilize the L0. After BSS0 signals for a channel switch, for example by asserting a power management (PM) bit, for example, a PM=1 bit on L1, BSS1 may begin utilizing L1 concurrently with communication on L0, by asserting a PM=0 bit on L1. Once L1 is enabled by BSS1, BSS1 may signal a channel switch on L0 to BSS0 by similarly asserting a PM=1 bit. Thus, for the duration of a frame exchange window, BSS1 may utilize both L0 and L1 concurrently, while the non-prioritized BSS0 must wait for BSS1 to release L0 before it is able to be enabled by BSS0. According to some examples, a PM bit set to a value 1 (e.g., PM=1 bit) may signal to the AP that a power-save mode should be entered, and the link put in a sleep, low-power mode, power-saving, or otherwise deactivated for the respective BSS.

Thus, in various embodiments, the ASML engine 310a, 310b, 410 may be configured to provide a dynamic, time division multiplex (TDM) based switching scheme for STR STAB to associate and operate over 2 STR-ML capable BSSs, utilizing IEEE defined power save mechanisms.

In some embodiments, the ASML engine 310a, 310b, 410 may further dynamically determine a dynamic dwell duration of BSS0 (e.g., the non-prioritized BSS) during which BSS1 (e.g., the prioritized BSS) may utilize a given link. A dynamic dwell duration may thus refer to the amount of time that a respective BSS utilizes a given link (e.g., the link is enabled and data exchanged on the link for the BSS). In some examples, the dynamic dwell duration (Y) may be determined based on historic dwell duration (T) of during a previous slot of the link. Thus, in some embodiments, the prioritized BSS (BSS1) may wait the duration of a dynamic dwell duration before enabling a link by asserting a PM=0 bit on the associated link. In some examples, a PM=1 bit may be asserted on the previously used link based on a fixed time elapsing from when the PM=1 bit is asserted. This duration may be equal to the frame exchange window. In other examples, the PM=1 bit may be asserted on the active link based on the dynamic dwell duration (Y). These and other relationships are described in further detail below with respect to FIG. 5.

Figure 5:
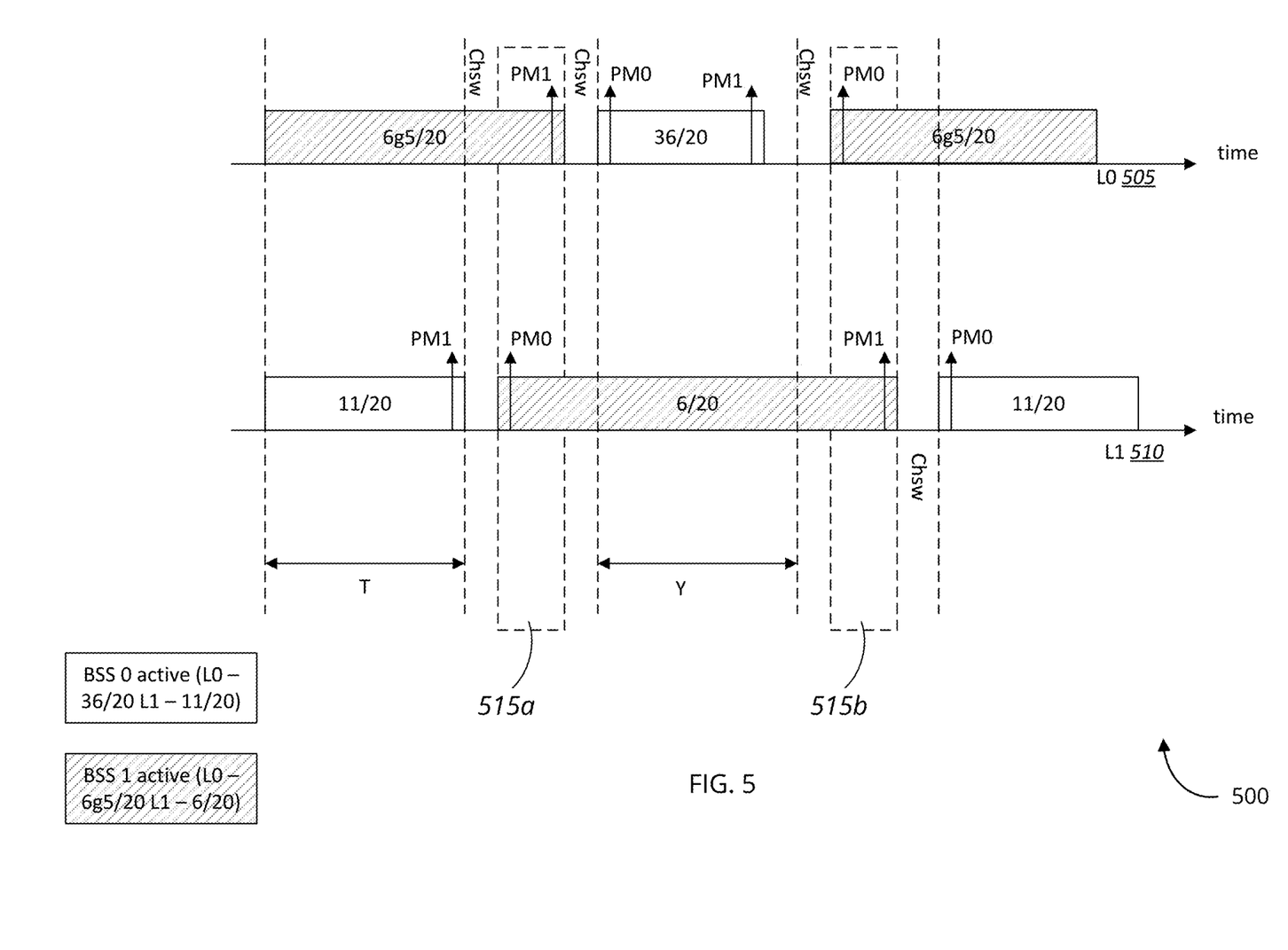
FIG. 5 is a timing diagram illustrating frames carried by two links during adaptive simultaneous multilink operation, in accordance with various embodiments.

FIG. 5 is a timing diagram 500 illustrating frames carried by two links during adaptive simultaneous multilink operation, in accordance with various embodiments. The timing diagram 500 includes two links, a first link (L0) 505, and a second link (L1) 510. Frames associated with a first BSS, BSS0, are depicted in hatched boxes, and frames associated with a second BSS, BSS1, are depicted as plain boxes. Continuing with the examples, above, BSS1 may be the prioritized BSS. The prioritized BSS, BSS1, may concurrently use both links L0 505 and L1 510 during a frame exchange window 515*a*, 515*b*. In various examples, L0 may be associated with a 5G/6G channel, and L1 associated with a 2G channel. A dynamic dwell duration (Y) and a historic dwell duration (T) of BSS0 are also depicted.

In various embodiments, link L1 510 may carry, during the first slot, one or more frames of BSS0. Link L0 505 may carry one or more frames of BSS1 during this slot, plus an additional duration of a channel switch (chsw) (e.g., a fixed duration of time) and a duration of frame exchange window 515*a*. After another chsw duration, L0 505 may begin carrying one or more frames of BSS0 during a second slot. The length of time during the first slot, in which one or more frames of BSS0 are carried on L1 510 may be have a dwell duration T. In some embodiments, ASML engine 310*a*, 310*b*, 410 may utilize the historic dwell duration T to determine a dynamic dwell duration Y for the second time slot. According to a set of examples, while BSS1 is active on L0 505, BSS1 may utilize channel 6g5/20. While utilizing L1 510, BSS1 may utilize channel 6/20. Similarly, BSS0 may use channel 36/20 of L0 505, and 11/20 on L1 510.

In various embodiments, ASML enables STAs to achieve two ML+ML concurrency without disruption of traffic on a prioritized BSS. ASML may be implemented with minimal latency increase and throughput disruption, while the priority BSS experiences no latency increase, as at least one link is always enabled. Moreover, ASML may achieve ML+ML concurrency without additional radios/slices, or any specialized frame exchanges utilized. Moreover, a dynamic dwell duration ensures user/application level traffic requirements are met on both prioritized and non-prioritized BSSs.

As previously described, in some further examples, an ASML engine 310*a*, 310*b*, 410 may be configured to determine a time for link switching, and dynamically determine dwell duration based on connection metrics. For example, in some embodiments, channel statistics may show one BSS having better performance than the other BSS. This may include interference on either of L0 and/or L1 being worse for one BSS than the other. Accordingly, the ASML engine may dynamically adjust a dwell duration for the non-prioritized BSS based on channel statistics, to maximize a better performing BSS' time on a link with better connection metrics. Similarly, in some examples, end-user requirements for throughput and/or latency may be determined per BSS. Accordingly, dwell duration and switching of BSSs for which respective links are enabled may be determined, at least in part, by throughput and/or latency requirements for the respective BSS. In yet further examples, packet success rate for the link per MCS may be used to determine a time to switch and/or dynamic dwell duration for a BSS with which a given MCS may be associated. Similarly, the ASML engine may determine a time to switch links and/or dwell duration based on link RSSI for a given BSS. For example, a prioritized BSS (BSS1) may have weak RSSI on L0. Accordingly, a dwell duration of BSS0 may be increased while L0 is enabled for BSS0, such that L1 is enabled for a longer duration for BSS1. In other examples, similar link utilization may be made to achieve increased RSSI performance for a desired BSS. In yet further examples, a combination of the above connection metrics may be utilized by the ASML engine to determine when to link switch and/or dynamic dwell duration.

According to various embodiments, like the MLO mode switch logic, the ASML engine may be implemented in hardware, software, or both hardware and software. For example, in some embodiments, the ASML engine may be implemented as an SoC firmware, assisted by hardware blocks, such as clear channel assessment (CCA) and/or OBSS detection and collection engines.

Figure 6:
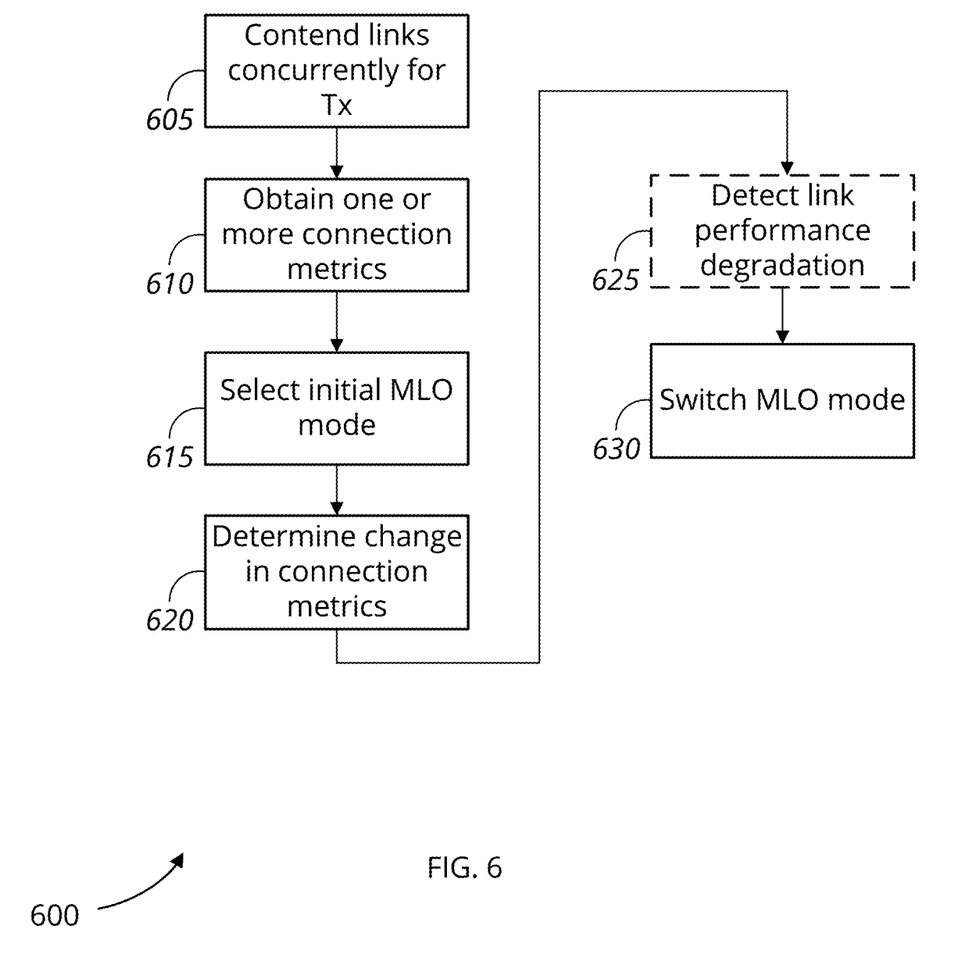
FIG. 6 is a flow diagram of a method for simultaneous STR-ML and EMLSR operation, in accordance with various embodiments.

FIG. 6 is a flow diagram of a method 600 for simultaneous STR-ML and EMLSR, in accordance with various embodiments. The method 600 begins, at block 605, by contending the links of a multilink connection concurrently for Tx operation. As previously described, in some examples, a multilink connection may include two or more links. In some examples, the multilink connection may include three links. A first link may be associated with the 2G band (e.g., 2.4 GHz), a second link associated with the 5G band (e.g., 5 GHz), and a third link associated with the 6G band (e.g., 6 GHz). Thus, in some examples, a MLD STA may contend all links of a multilink connection for Tx operation. In this way, an STA may be able to attain very low latency and fast medium access based on link availability. In some examples, contending on all three links may include simultaneous operation of the MLD STA in both STR-ML and EMLSR modes. For example, in STR-ML mode, the MLD STA may contend on the first and second link (e.g., 2G & 5G), or the first and third link (e.g., 2G & 6G). The remaining link may be contended in EMLSR mode (e.g., 5G or 6G, whichever is not operating in STR-ML).

The method 600 may continue, at block 610, by obtaining one or more connection metrics for the links of the multilink connection. The one or more connection metrics may include, without limitation, channel statistical information, such as interference in OBSS, MSS channel usage, and/or historical Tx rates on each channel/link. The one or more connection metrics may further include chip-level interference from other radios or devices, and range/RSSI.

At block 615, the method 600 continues by selecting an initial MLO mode. As previously described, an MLO mode may be selected based on the one or more connection metrics. MLO modes may be 1) STR-ML on one of the first and second link, or first and third link; 2) EMLSR on one of the second or third links; or 3) simultaneous STR-ML and EMLSR operation on all three links. For example, if it is determined that one of the channels is used for IBSS and thus unable to be used by the MLD STA, the MLD STA may enter EMLSR utilizing two of the channels that are not used by the IBSS. Similarly, if interference is detected on one of the STR-ML channels, the MLD STA may enter EMLSR mode. Similarly, if interference is caused by one or more other radio devices, such as a Bluetooth radio at 2.4 GHz, the MLD STA may similarly switch to EMLSR mode on the third or second link. In this way, the one or more connection metrics may be used to select, and subsequently enter an initial MLO mode.

The method 600 further includes, at block 620, determining a change in the one or more connection metrics. In some embodiments, the method 600 includes, at block 625, detecting a link performance degradation based on the change in the one or more connection metrics. Changes in the one or more connection metrics may include changes to the channel statistical information, such as detected interference, or increased traffic on a channel/link. Other changes may include roaming of the MLD STA, resulting in changes to RSSI in one or more links. For example, an MLD STA roaming further away from an AP may result in weakened RSSI in 5G/6G bands, while RSSI may be acceptable in the 2G bands.

At block 630, the method 600 may continue by switching an MLO mode based on the change in the one or more connection metrics, such as the detected link performance degradation. For example, as previously described, an MLD STA may previously have been operating in EMLSR mode in the 5G or 6G bands. When movement of the MLD STA results in weakened RSSI in the 5G/6G bands, the MLD STA may switch, from EMLSR mode to STR-ML mode, such that communications may simultaneously be conducted over a 2G link. In further examples, a channel previously used in STR-ML mode may become degraded and/or unavailable. Thus, the MLD STA may switch to an EMLSR mode, or STR-ML mode that does not utilize the unavailable and/or degraded channel. In other, yet further examples, MLO modes may similarly be switched based on the changes to the one or more connection metrics, as appropriate. In various embodiments, MLO mode switch logic may be executed to cause the MLD STA to perform the processes described above with respect to the method 600.

Figure 7:
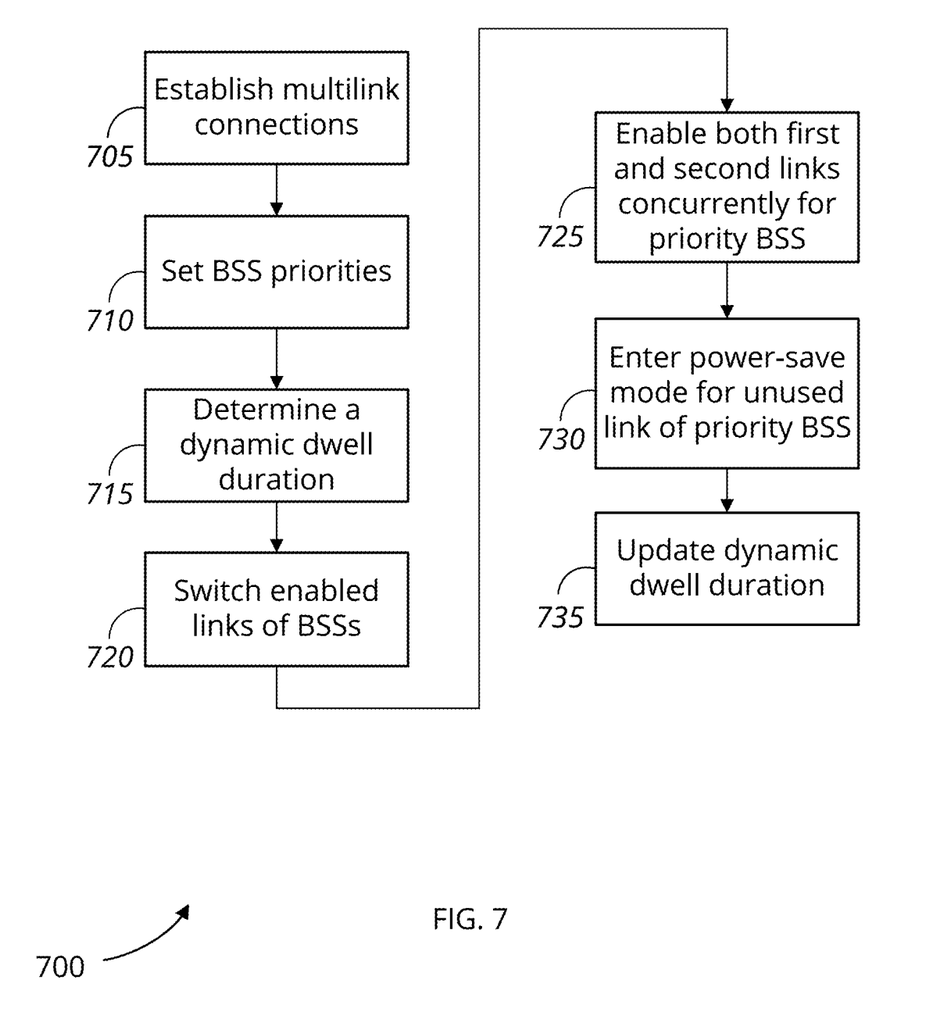
FIG. 7 is a flow diagram of a method for adaptive simultaneous multilink operation, in accordance with various embodiments.

FIG. 7 is a flow diagram of a method 700 for adaptive simultaneous multilink operation, in accordance with various embodiments. The method 700 begins, at block 705, by establishing two or more multilink connections. As previously described, MLD STA may be configured to establish two or more concurrent multilink connections. In some examples, the MLD STA may establish two concurrent multilink connections, each multilink connection associated with a respective BSS. A first multilink connection may be associated with a first BSS (BSS0), and the second multilink connection associated with a second BSS (BSS1).

The method 700 may continue, at block 710, by establishing BSS priorities. In some examples, BSS priority may indicate a priority BSS for which the MLD STA may maintain at least one link of the multilink connection in a persistent manner. In other words, the MLD STA may maintain a persistent multilink connection for the priority BSS. In some examples, where there are more than two BSSs, establishing a BSS priority may include ranking a priority of the BSS connection. In some examples, BSS priority may affect a dwell duration or the length of time that a respective BSS may utilize one or more links of the multilink connection.

At block 715, the method 700 continues by determining a dynamic dwell duration for the BSSs. Specifically, according to some examples, the dynamic dwell duration may be a dwell duration of the non-priority BSS, which may be determined dynamically based on historic dwell durations (e.g., a dwell duration during a previous slot of the non-priority BSS), and/or one or more connection metrics. Suitable connections metrics may include, without limitation, a priority of BSS, channel statistics (e.g., interference, traffic, busy or reserved channels, etc.), end-user requirements (e.g., throughput and latency per BSS), and packet success rates per link per modulation and coding scheme (MCS), and link RSSI.

At block 720, the method 700 includes switching enabled links of the BSSs. As previously described, switching of enabled links of the respective BSSs may include, first, switching the enabled link of the non-priority BSS. In some examples, the enabled link of the non-priority BSS may be switched after the length of the dynamic dwell time has elapsed. In some examples, switching of the enabled link of the non-priority BSS may include asserting a PM bit (PM=1), to indicate entering of a power-save mode on the link. Thus, in some examples, switching the enabled links of the non-priority BSS may include, first, entering a power-save mode on the currently enabled link, before enabling the other link of the multilink connection. Subsequently, the priority BSS may enable the link no longer in use by the non-priority BSS. In some embodiments, this may include asserting a PM bit (PM=0) to indicate activation of the link. The method 700 may thus continue, at block 725, by enabling both the first and second links concurrently for the priority BSS. As previously described, in some embodiments, the priority BSS may utilize both links of the multilink connection for a duration of a frame exchange window. The frame exchange window may be a duration of time that both links are active before a PM=0 bit is asserted on the link that will no longer be used by the priority BSS. Thus, at block 730, the method 700 may continue by entering a power-save mode for the unused link of the priority BSS. Once the link is no longer used by the priority BSS, the non-priority BSS may begin using the link by similarly asserting a PM=1 bit on the link.

The method 700 further includes, at block 735, updating the dynamic dwell duration. As previously described, the dynamic dwell duration may be updated based on historic dwell duration and/or the one or more connection metrics. Accordingly, the one or more connection metrics may further be updated. As previously described, in some examples, channel statistics may show one BSS having better performance than the other BSS. This may include interference on either of a first link (L0) and/or second link (L1) being worse for one BSS than the other. Accordingly, an MLD STA (or an ASML engine of the MLD STA) may dynamically adjust dwell duration for the non-prioritized BSS based on channel statistics. Similarly, in further examples, end-user requirements for throughput and/or latency may be determined per BSS. In yet further examples, packet success rate for the link per MCS may be used to determine a time to switch and/or dynamic dwell duration for a BSS with which a given MCS may be associated. Similarly, the MLD STA may determine a time to switch links and/or dwell duration based on link RSSI for a given BSS. In yet further examples, a combination of the above connection metrics may be utilized to determine when to link switch and/or dynamic dwell duration.

In various embodiments, ASML engine may be configured to cause the MLD STA to perform the processes described above with respect to the method 700.

Figure 8:
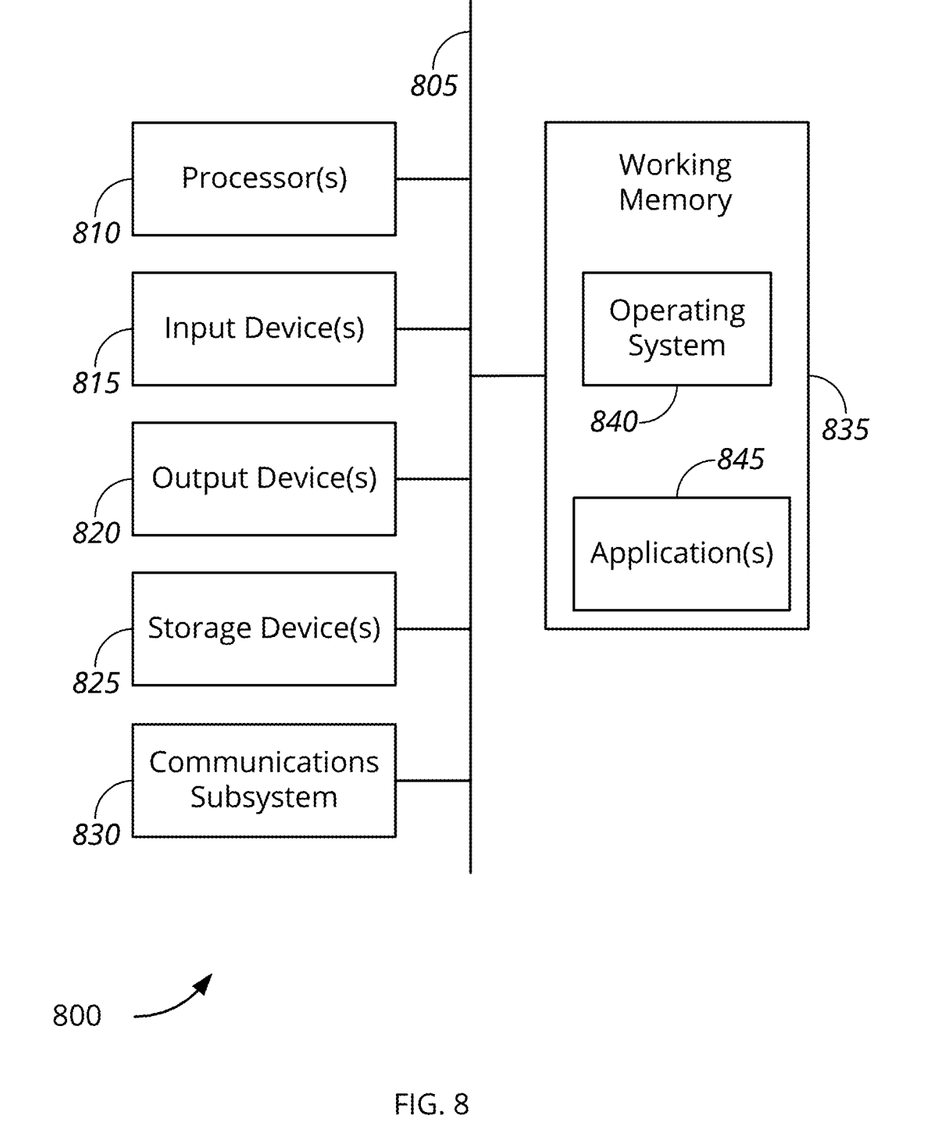
FIG. 8 is a schematic block diagram of a computer system for adaptive simultaneous multilink operation, in accordance with various embodiments.

The techniques and processes described above with respect to various embodiments may be performed by one or more computer systems. FIG. 8 is a schematic block diagram of a computer system 800 for adaptive simultaneous multilink operation, and simultaneous STR-ML and EMLSR operation, in accordance with various embodiments. FIG. 8 provides a schematic illustration of one embodiment of a computer system 800, such as the systems 100, 200, 300, 400 or subsystems thereof, including MLD STAs 210, 305a, 305b, 315a, 315b, 405, 415 and MLD APs 205, 325, 330, 425, 430 which may perform the methods provided by various other embodiments, as described herein. It should be noted that FIG. 8 only provides a generalized illustration of various components, of which one or more of each may be utilized as appropriate. FIG. 8, therefore, broadly illustrates how individual system elements may be implemented in a relatively separated or relatively more integrated manner.

The computer system 800 includes multiple hardware elements that may be electrically coupled via a bus 805 (or may otherwise be in communication, as appropriate). The hardware elements may include one or more processors 810, including, without limitation, one or more general-purpose processors and/or one or more special-purpose processors (such as microprocessors, digital signal processing chips, graphics acceleration processors, and microcontrollers); one or more input devices 815, which include, without limitation, a mouse, a keyboard, one or more sensors, and/or the like; and one or more output devices 820, which can include, without limitation, a display device, and/or the like.

The computer system 800 may further include (and/or be in communication with) one or more storage devices 825, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 800 might also include a communications subsystem 830, which may include, without limitation, a modem, one or more radios, transceivers, a network card (wireless or wired), an IR communication device, a wireless communication device and/or chipset (such as a Bluetooth™ device, an 802.11 device, a WiFi device, a WiMax device, a WWAN device, a Z-Wave device, a ZigBee device, cellular communication facilities, a wireless integrated circuit (IC) device, etc.), and/or a low-power wireless device. The communications subsystem 830 may permit data to be exchanged with a network (such as the network described below, to name one example), with other computer or hardware systems, between data centers or different cloud platforms, and/or with any other devices described herein. In many embodiments, the computer system 800 further comprises a working memory 835, which can include a RAM or ROM device, as described above.

The computer system 800 also may comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, application specific integrated circuits (ASICs), system on a chip (SoC), or other custom IC) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer readable medium, such as one or more of the storage device(s) 825. Merely by way of example, execution of the sequences of instructions contained in the working memory 835 might cause the processor(s) 810 to perform one or more procedures of the methods described herein.

The terms "machine readable medium" and "computer readable medium," as used herein, refer to any medium that participates in providing data that causes a machine to operate in a specific fashion. In an embodiment implemented using the computer system 800, various computer readable media might be involved in providing instructions/code to processor(s) 810 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 825. Volatile media includes, without limitation, dynamic memory, such as the working memory 835. In some alternative embodiments, a computer readable medium may take the form of transmission media, which includes, without limitation, coaxial cables, copper wire and fiber optics, including the wires that comprise the bus 805, as well as the various components of the communication subsystem 830 (and/or the media by which the communications subsystem 830 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals, and/or the like, are all examples of carrier waves on which instructions can be encoded, in accordance with various embodiments of the invention.

The communications subsystem 830 (and/or components thereof) generally receives the signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a storage device 825 either before or after execution by the processor(s) 810.

While some features and aspects have been described with respect to the embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while some functionality is ascribed to one or more system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without some features for ease of description and to illustrate aspects of those embodiments, the various components and/or features described herein with respect to a particular embodiment can be substituted, added and/or subtracted from among other described embodiments, unless the context dictates otherwise. Consequently, although several embodiments are described above, it will be appreciated that the invention is intended to cover all modifications and equivalents within the scope of the following claims.

What is claimed is:

1. A method comprising:
   establishing, via a multilink device station, a first multilink connection associated with a first basic service set and a second multilink connection associated with a second basic service set;
   setting, via an adaptive simultaneous multilink engine, the second basic service set as a priority basic service set, wherein the priority basic service set is allowed to have at least one link of the second multilink connection enabled at all times while the priority basic service set is active;
   switching, via the adaptive simultaneous multilink engine, an enabled link of the first basic service set on which communications are carried, wherein switching the enabled link includes switching from using a first link of the first multilink connection to a second link of the first multilink connection, based at least in part on a dynamic dwell duration of the first basic service set; and
   in response to determining that the enabled link of the first basic service set has been switched, switching an enabled link of the second basic service set based, at least in part, on the dynamic dwell duration,
   wherein the dynamic dwell duration of the first basic service set is determined based, at least in part, on one or more connection metrics, and
   wherein switching the enabled link of the second basic service set includes enabling the first link while the second link is concurrently enabled for a first duration, and disabling the second link after the first duration.

2. The method of claim 1, wherein the one or more connection metrics includes at least one of a priority of the first basic service set, channel statistical information of the first and second links, end-user requirements for throughput or latency for the first and second basic service sets, packet success rate per link and per basic service set, and a respective received signal strength indicator of the first and second links for each of the first and second basic service sets.

3. The method of claim 1, further comprising:
   determining, via the adaptive simultaneous multilink engine, the dynamic dwell duration based, at least in part on a historic dwell duration during a previous slot of at least one of the first or second link.

4. The method of claim 1, wherein switching the enabled link of either the first basic service set or second basic service set includes transmitting a power management bit enabling a respective link on one of the first link or the second link, and transmitting a power management bit entering a power-saving mode for the respective link on one of the second link or the first link that the power management bit enabling the respective link is not transmitted.

5. The method of claim 1, further comprising:
   contending, via the multilink device station, the first link, second link, and a third link for data transmission in at least one of the first multilink connection or second multilink connection;
   determining, via a multilink operation mode switch logic, a first MLO mode to operate based, at least in part on the one or more connection metrics of the at least one of the first multilink connection or second multilink connection; and switching, via the multilink operation mode switch logic, to a second MLO mode based, at least in part, on a change in the one or more connection metrics of the at least one of the first multilink connection or second multilink connection.

6. The method of claim 5, wherein the first MLO mode and second MLO mode are respectively one of a simultaneous transmit and receive multilink (STR-ML) mode operating on two of the three links of the at least one of the first multilink connection or second multilink connection, an enhanced multilink single radio (EMLSR) mode operating on one of the three links of the at least one of the first multilink connection or second multilink connection, and simultaneous operation of STR-ML and EMLSR across all three links of the at least one of the first multilink connection or second multilink connection.

7. The method of claim 6, wherein in STR-ML mode, the first link, associated with a 2.4 GHz band, and one of the second link, associated with a 5 GHz band, or the third link, associated with a 6 GHz band, are enabled.

8. The method of claim 6, wherein in EMLSR mode, one of the second link, associated with a 5 GHz band, or the third link, associated with a 6 GHz band, is enabled.

9. A non-transitory computer readable medium in communication with the processor, the non-transitory computer readable medium having encoded thereon a set of instructions executable by the processor to:
establish, via a multilink device station, a first multilink connection associated with a first basic service set and a second multilink connection associated with a second basic service set;
set the second basic service set as a priority basic service set, wherein the priority basic service set is allowed to have at least one link of the second multilink connection enabled at all times while the priority basic service set is active;
switch an enabled link of the first basic service set on which communications are carried, wherein switching the enabled link includes switching from using a first link of the first multilink connection to a second link of the first multilink connection, based at least in part on a dynamic dwell duration of the first basic service set; and
in response to determining that the enabled link of the first basic service set has been switched, switch an enabled link of the second basic service set based, at least in part, on the dynamic dwell duration, wherein the dynamic dwell duration of the first basic service set is determined based, at least in part, on one or more connection metrics, and wherein switching the enabled link of the second basic service set includes enabling the first link while the second link is concurrently enabled for a first duration, and disabling the second link after the first duration.

10. The non-transitory computer readable medium of claim 9, wherein the one or more connection metrics includes at least one of a priority of the first basic service set, channel statistical information of the first and second links, end-user requirements for throughput or latency for the first and second basic service sets, packet success rate per link and per basic service set, and a respective received signal strength indicator of the first and second links for each of the first and second basic service sets.

11. The non-transitory computer readable medium of claim 9, wherein the set of instructions is further executable by the processor to:
determine, via the adaptive simultaneous multilink engine, the dynamic dwell duration based, at least in part on a historic dwell duration during a previous slot of at least one of the first or second link.

12. The non-transitory computer readable medium of claim 9, wherein switching the enabled link of either the first basic service set or second basic service set includes transmitting a power management bit enabling a respective link on one of the first link or the second link, and transmitting a power management bit entering a power-saving mode for the respective link on one of the second link or the first link that the power management bit enabling the respective link is not transmitted.

13. The non-transitory computer readable medium of claim 9, wherein the set of instructions is further executable by the processor to:
contend, via the multilink device station, the first link, second link, and a third link for data transmission in at least one of the first multilink connection or second multilink connection;
determine a first MLO mode to operate based, at least in part on the one or more connection metrics of the at least one of the first multilink connection or second multilink connection; and
switch to a second MLO mode based, at least in part, on a change in the one or more connection metrics of the at least one of the first multilink connection or second multilink connection.

14. The non-transitory computer readable medium of claim 13, wherein the first MLO mode and second MLO mode are respectively one of a simultaneous transmit and receive multilink (STR-ML) mode operating on two of the three links of the at least one of the first multilink connection or second multilink connection, an enhanced multilink single radio (EMLSR) mode operating on one of the three links of the at least one of the first multilink connection or second multilink connection, and simultaneous operation of STR-ML and EMLSR across all three links of the at least one of the first multilink connection or second multilink connection.

15. The non-transitory computer readable medium of claim 14, wherein in STR-ML mode, the first link, associated with a 2.4 GHz band, and one of the second link, associated with a 5 GHz band, or the third link, associated with a 6 GHz band, are enabled, and wherein in EMLSR mode, one of the second link, associated with a 5 GHz band, or the third link, associated with a 6 GHz band, is enabled.

16. A system comprising:
a processor; and
a non-transitory computer readable medium in communication with the processor, the non-transitory computer readable medium having encoded thereon a set of instructions executable by the processor to:
establish a first multilink connection associated with a first basic service set and a second multilink connection associated with a second basic service set;
set the second basic service set as a priority basic service set, the priority basic service set configured to have at least one link of the second multilink connection enabled at all times while the priority basic service set is active;
switch an enabled link of the first basic service set on which communications are carried, wherein switching the enabled link includes switching from using a first link of the first multilink connection to a second link of the first multilink connection, based at least in part on a dynamic dwell duration of the first basic service set; and in response to determining that the enabled link of the first basic service set has been switched, switch an enabled link of the second basic service set based, at least in part, on the dynamic dwell duration, wherein the dynamic dwell duration of the first basic service set is determined based, at least in part, on one or more connection metrics, and wherein switching the enabled link of the second basic service set includes enabling the first link while the second link is concurrently enabled for a first duration, and disabling the second link after the first duration.

17. The system of claim 16, wherein the one or more connection metrics includes at least one of a priority of the first basic service set, channel statistical information of the first and second links, end-user requirements for throughput or latency for the first and second basic service sets, packet success rate per link and per basic service set, and a respective received signal strength indicator of the first and second links for each of the first and second basic service sets.

18. The system of claim 16, wherein the set of instructions is further executable by the processor to:
determine, via the adaptive simultaneous multilink engine, the dynamic dwell duration based, at least in part on a historic dwell duration during a previous slot of at least one of the first or second link.

19. The system of claim 16, wherein the set of instructions is further executable by the processor to:
contend, via the multilink device station, the first link, second link, and a third link for data transmission in at least one of the first multilink connection or second multilink connection;
determine a first MLO mode to operate based, at least in part on the one or more connection metrics of the at least one of the first multilink connection or second multilink connection; and
switch to a second MLO mode based, at least in part, on a change in the one or more connection metrics of the at least one of the first multilink connection or second multilink connection.

20. The system of claim 16, wherein the first MLO mode and second MLO mode are respectively one of a simultaneous transmit and receive multilink (STR-ML) mode operating on two of the three links of the at least one of the first multilink connection or second multilink connection, an enhanced multilink single radio (EMLSR) mode operating on one of the three links of the at least one of the first multilink connection or second multilink connection, and simultaneous operation of STR-ML and EMLSR across all three links of the at least one of the first multilink connection or second multilink connection.

21. A wireless integrated circuit device comprising:
a transceiver configured to transmit and receive wireless transmissions, the wherein transceiver includes a plurality of radios;
a simultaneous multilink operation logic configured to:
establish, via the transceiver, a first multilink connection associated with a first basic service set and a second multilink connection associated with a second basic service set;
set the second basic service set as a priority basic service set, the priority basic service set configured to have at least one link of the second multilink connection enabled at all times while the priority basic service set is active;
switch an enabled link of the first basic service set on which communications are carried, wherein switching the enabled link includes switching from using a first link of the first multilink connection to a second link of the first multilink connection, based at least in part on a dynamic dwell duration of the first basic service set; and
in response to determining that the enabled link of the first basic service set has been switched, switch an enabled link of the second basic service set based, at least in part, on the dynamic dwell duration, wherein the dynamic dwell duration of the first basic service set is determined based, at least in part, on one or more connection metrics, and wherein switching the enabled link of the second basic service set includes enabling the first link while the second link is concurrently enabled for a first duration, and disabling the second link after the first duration.

22. The wireless integrated circuit device of claim 21, wherein the one or more connection metrics includes at least one of a priority of the first basic service set, channel statistical information of the first and second links, end-user requirements for throughput or latency for the first and second basic service sets, packet success rate per link and per basic service set, and a respective received signal strength indicator of the first and second links for each of the first and second basic service sets.

23. The wireless integrated circuit device of claim 21, wherein the simultaneous multilink operation logic is further configured to:
determine the dynamic dwell duration based, at least in part on a historic dwell duration during a previous slot of at least one of the first or second link.

24. The wireless integrated circuit device of claim 21, wherein the simultaneous multilink operation logic is further configured to:
contend, via the transceiver, the first link, second link, and a third link for data transmission in at least one of the first multilink connection or second multilink connection;
determine a first MLO mode to operate based, at least in part on the one or more connection metrics of the at least one of the first multilink connection or second multilink connection; and
switch to a second MLO mode based, at least in part, on a change in the one or more connection metrics of the at least one of the first multilink connection or second multilink connection.

25. The wireless integrated circuit device of claim 21, wherein the first MLO mode and second MLO mode are respectively one of a simultaneous transmit and receive multilink (STR-ML) mode operating on two of the three links of the at least one of the first multilink connection or second multilink connection, an enhanced multilink single radio (EMLSR) mode operating on one of the three links of the at least one of the first multilink connection or second multilink connection, and simultaneous operation of STR-ML and EMLSR across all three links of the at least one of the first multilink connection or second multilink connection.

* * * * *